United States Patent
Al-Qasim et al.

(10) Patent No.: US 12,104,118 B2
(45) Date of Patent: Oct. 1, 2024

(54) ADVANCED ENCAPSULATION FOR DOWNHOLE WATER CAPTURE AND IMPROVED OIL RECOVERY

(71) Applicant: SAUDI ARABIAN OIL COMPANY, Dhahran (SA)

(72) Inventors: Abdulaziz S. Al-Qasim, Dammam (SA); Yuguo Wang, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/178,226

(22) Filed: Mar. 3, 2023

(65) Prior Publication Data
US 2024/0026216 A1    Jan. 25, 2024

Related U.S. Application Data
(60) Provisional application No. 63/368,912, filed on Jul. 20, 2022.

(51) Int. Cl.
*E21B 43/16* (2006.01)
*C09K 8/594* (2006.01)

(52) U.S. Cl.
CPC .................... *C09K 8/594* (2013.01)

(58) Field of Classification Search
CPC ........ E21B 43/16; E21B 43/164; C09K 8/594
See application file for complete search history.

(56) References Cited

U.S. PATENT DOCUMENTS

| | | | | |
|---|---|---|---|---|
| 4,627,495 | A | * | 12/1986 | Harris ................... E21B 43/267 166/280.1 |
| 5,942,469 | A | * | 8/1999 | Juprasert ............ B01D 19/0409 166/371 |

(Continued)

FOREIGN PATENT DOCUMENTS

| CN | 1081200 C | * | 3/2002 |
|---|---|---|---|
| CN | 104194762 A | | 12/2014 |

(Continued)

OTHER PUBLICATIONS

Liu, T. et al. "Kinetics of the precipitation polymerization of acrylic acid in supercritical carbon dioxide: The locus of polymerization" Chemical Engineering Science 61 (2006) 3129-3139 (11 pages).

(Continued)

*Primary Examiner* — Matthew R Buck
(74) *Attorney, Agent, or Firm* — Osha Bergman Watanabe & Burton LLP

(57) ABSTRACT

A composition includes a carbon dioxide ($CO_2$) emulsion including a continuous critical or supercritical $CO_2$ phase and a discontinuous phase including a polyacrylate. A method of making a $CO_2$ emulsion includes providing a first solution of a polyacrylic acid and critical or supercritical $CO_2$, providing a second solution of a base and critical or supercritical $CO_2$, and mixing the first solution and the second solution such that the polyacrylic acid and the base react to form an emulsion of polyacrylate droplets in critical or supercritical $CO_2$. A method of treating a hydrocarbon-bearing formation includes introducing an emulsion including a continuous $CO_2$ phase and a discontinuous phase comprising a polyacrylate into the formation, contacting the emulsion with an aqueous reservoir fluid in the hydrocarbon-bearing formation, and absorbing an amount of the (Continued)

aqueous reservoir fluid into the polyacrylate of the emulsion to provide a dense $CO_2$ emulsion.

16 Claims, 3 Drawing Sheets

(56) References Cited

U.S. PATENT DOCUMENTS

| | | | |
|---|---|---|---|
| 7,373,977 B1 | 5/2008 | Berger et al. | |
| 8,985,212 B1* | 3/2015 | Crespo | C09K 8/588 |
| | | | 166/305.1 |
| 10,876,040 B2 | 12/2020 | Barati Ghahfarokhi | |
| 10,961,436 B2 | 3/2021 | Al-Otaibi et al. | |
| 11,034,883 B2 | 6/2021 | Johnson et al. | |
| 11,060,014 B2 | 7/2021 | Al-Otaibi et al. | |
| 11,078,411 B2 | 8/2021 | Johnson et al. | |
| 2004/0168798 A1* | 9/2004 | Creel | C09K 8/508 |
| | | | 166/275 |
| 2010/0243248 A1* | 9/2010 | Golomb | E21B 41/0064 |
| | | | 166/270 |
| 2013/0109879 A1 | 5/2013 | Berger et al. | |
| 2013/0168089 A1* | 7/2013 | Berg | C09K 8/588 |
| | | | 166/270.1 |
| 2015/0096755 A1* | 4/2015 | Martucci | C09K 8/594 |
| | | | 166/305.1 |
| 2017/0198201 A1 | 7/2017 | Chang | |

FOREIGN PATENT DOCUMENTS

| | | | | |
|---|---|---|---|---|
| WO | WO-2005024180 A1 * | 3/2005 | | C09K 8/62 |
| WO | 2017/204280 A1 | 11/2017 | | |

OTHER PUBLICATIONS

Menossi, M. et al. "Volumetric properties of carbon dioxide + acrylic acid binary in the context of supercritical precipitation polymerization" The Journal of Supercritical Fluids, 2020, 160, 104787 (52 pages).

Liu. T. et al. "Cross-linking polymerization of acrylic acid in supercritical carbon dioxide" Polymer 47 (2006) 4276-4281 (6 pages).

Romack, T. J et al. "Precipitation Polymerization of Acrylic Acid in Supercritical Carbon Dioxide" Macromolecules 1995, 28, 912-915 (4 pages).

Xu, Q. et al. "Precipitation Polymerization of Acrylic Acid in Compressed Carbon Dioxide-Cosolvent Systems" Journal of Applied Polymer Science, vol. 88, 1876-1880 (2003) (5 pages).

Al Hinai, Nasser M., et al. "Experimental evaluations of polymeric solubility and thickeners for supercritical CO2 at high temperatures for enhanced oil recovery." Energy & fuels 32.2 (2018): 1600-1611 (12 pages).

Kalyanaraman, Nishkriya, et al. "Stability improvement of CO2 foam for enhanced oil-recovery applications using polyelectrolytes and polyelectrolyte complex nanoparticles." Journal of Applied Polymer Science 134.6 (2017) (15 pages).

Ma, Li, et al. "Improvement in the water-absorbing properties of superabsorbent polymers (acrylic acid-co-acrylamide) in supercritical CO2." Journal of applied polymer science 86.9 (2002): 2272-2278 (7pages).

* cited by examiner

ADVANCED ENCAPSULATION FOR DOWNHOLE WATER CAPTURE AND IMPROVED OIL RECOVERY

CROSS REFERENCE TO RELATED APPLICATIONS

This application claims the benefit of U.S. Patent application Ser. No. 63/368,912, which was filed on Jul. 20, 2022, and is incorporated herein by reference.

BACKGROUND

During primary oil recovery, oil inside an underground hydrocarbon reservoir is driven to the surface (for example, toward the surface of an oil well) by a pressure difference between the reservoir and the surface. However, only a fraction of the oil in an underground hydrocarbon reservoir can be extracted using primary oil recovery. Thus, a variety of techniques for enhanced oil recovery are utilized after primary oil recovery to increase the production of hydrocarbons from hydrocarbon-bearing formations. Some examples of these techniques include water flooding, chemical flooding, and supercritical $CO_2$ injections.

Supercritical $CO_2$ is a useful fluid for enhanced oil recovery applications due to its chemical and physical properties as well as providing the opportunity to introduce a greenhouse gas into a subterranean area. Supercritical $CO_2$ is miscible with hydrocarbons. Thus, when it contacts hydrocarbon fluid in a reservoir, the fluid is displaced from the rock surfaces and pushed toward the production well. Additionally, $CO_2$ may dissolve in the hydrocarbon fluid, reducing the viscosity of the hydrocarbon fluid and causing it to swell. This further enhances the ability to recover hydrocarbons and increase production.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a composition including a carbon dioxide ($CO_2$) emulsion including a continuous critical or supercritical $CO_2$ phase and a discontinuous phase including a polyacrylate.

In another aspect, embodiments disclosed herein relate to a method of making a $CO_2$ emulsion that includes providing a first solution of a polyacrylic acid and critical or supercritical $CO_2$, providing a second solution of a base and critical or supercritical $CO_2$, and mixing the first solution and the second solution such that the polyacrylic acid and the base react to form an emulsion of polyacrylate droplets in critical or supercritical $CO_2$.

In yet another aspect, embodiments disclosed herein relate to a method of treating a hydrocarbon-bearing formation. The method includes introducing an emulsion including a continuous critical or supercritical $CO_2$ phase and a discontinuous phase comprising a polyacrylate into the hydrocarbon-bearing formation, contacting the emulsion with an aqueous reservoir fluid in the hydrocarbon-bearing formation, and absorbing an amount of the aqueous reservoir fluid into the polyacrylate of the emulsion to provide a dense $CO_2$ emulsion.

Other aspects and advantages of the claimed subject matter will be apparent from the following description and the appended claims.

DETAILED DESCRIPTION

Carbon dioxide ($CO_2$) is widely used in flooding processes for enhanced oil recovery. While $CO_2$ has an affinity for hydrocarbons and may be readily used in a supercritical state in a hydrocarbon-bearing formation, there are a number of challenges associated with its use. For example, the density of $CO_2$ is less than many of the fluids present in subterranean formations, including water and the liquid and semi-solid hydrocarbons. Due to this low density, $CO_2$ has a tendency to seek upward-directed flow paths in the reservoir as it progresses away from the injection point and through the reservoir. This may lead to the injected $CO_2$ preferentially bypassing areas of the reservoir, thus leaving portions of the reservoir untreated. This phenomenon is called "gravity override."

The present disclosure relates to compositions and methods for increasing and maintaining the density of supercritical $CO_2$ by adding an aqueous fluid and an anionic polyelectrolyte to carbon dioxide in the critical or supercritical state ("SCCO2"). In one or more embodiments, an anionic polyelectrolyte may be added to SCCO2 to provide an initial emulsion which is and then pumped into a reservoir, where the initial emulsion may capture downhole water, effectively providing a dense SCCO2 emulsion. SCCO2 emulsions described herein provide a SCCO2 composition downhole that has an increased density and thereby does not suffer from the gravity override effect. Such compositions may lead to improved sweep efficiency and enhanced oil recovery of a hydrocarbon-bearing formation as well as reduced water cut in produced hydrocarbons due to the water-capture ability of the initial emulsion.

$CO_2$ Emulsion Composition

In one aspect, embodiments of the present disclosure relate to compositions of $CO_2$ emulsions for enhanced oil recovery. Such $CO_2$ emulsions may include a continuous phase of critical or supercritical $CO_2$ and a discontinuous phase including an anionic polyelectrolyte. The anionic polyelectrolyte may be capable of absorbing an aqueous fluid. The anionic polyelectrolyte may be capable of retaining an absorbed aqueous fluid, without releasing such absorbed fluid, even under moderate pressures. Accordingly, in one or more embodiments, an initial $CO_2$ emulsion including an anionic polyelectrolyte absorbs an aqueous fluid to provide a dense $CO_2$ emulsion. In such instances, the aqueous fluid may be absorbed by the initial emulsion after being injected into a hydrocarbon-bearing formation. Embodiment $CO_2$ emulsions may have an increased density compared to conventional $CO_2$ treatment compositions.

Figure 1:
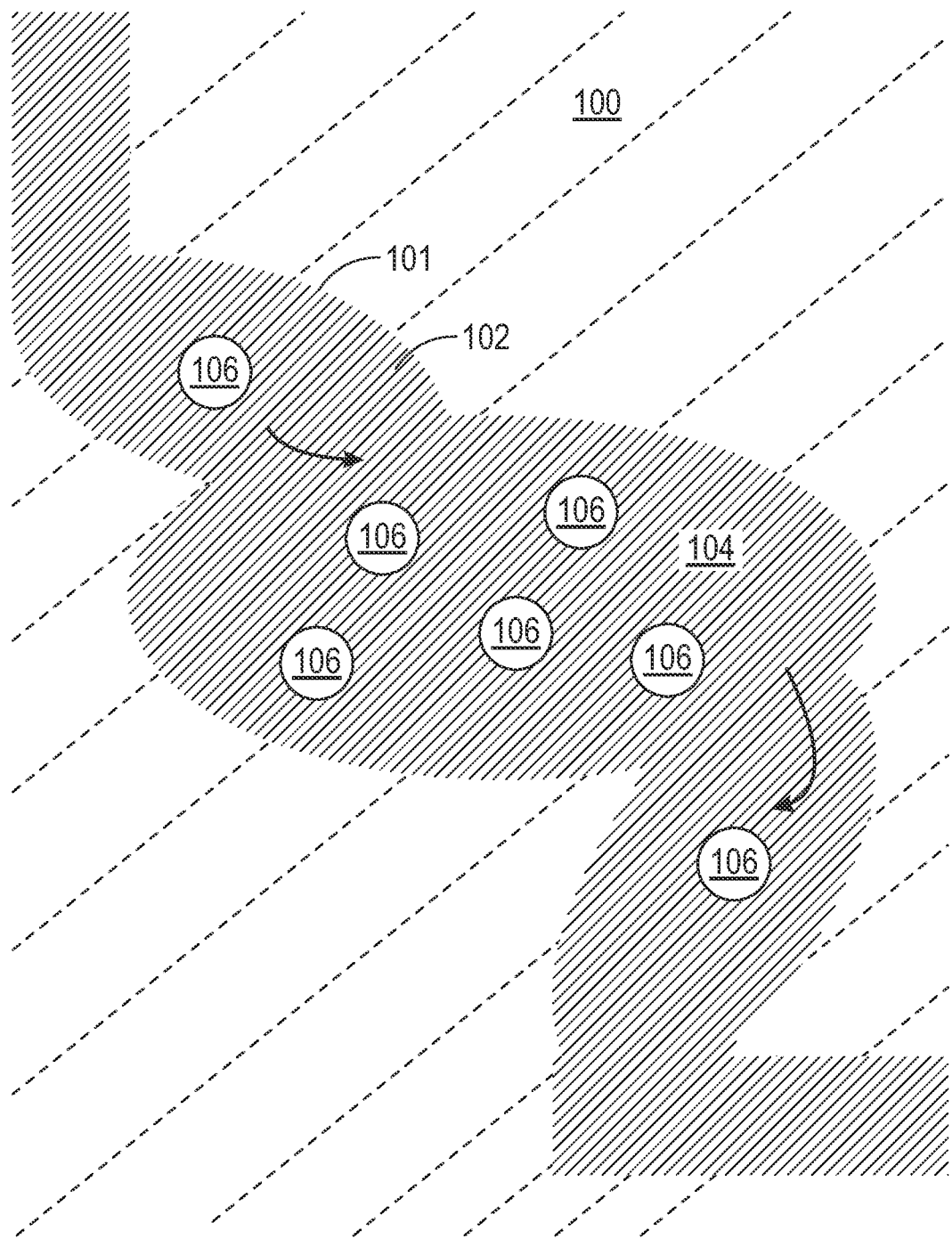
FIG. 1 shows a schematic depiction of a $CO_2$ emulsion according to one or more embodiments of the present disclosure in use in a hydrocarbon-bearing formation.

FIG. 1 shows a simplified schematic of an embodiment dense $CO_2$ emulsion composition in use in a hydrocarbon-bearing formation. As shown in FIG. 1, a hydrocarbon-bearing formation 100 has pores 101 throughout. $CO_2$ emulsion 102 has a continuous phase of critical $CO_2$ or SCCO2 104. In the continuous phase 104, a discontinuous phase includes discrete droplets 106 of hydrated anionic polyelectrolyte. Herein "hydrated anionic polyelectrolyte" refers to an anionic polyelectrolyte that has absorbed an amount of an aqueous phase.

In one or more embodiments, $CO_2$ emulsion compositions include an anionic polyelectrolyte. Due to the ionic nature of anionic polyelectrolytes, some are able to absorb large amounts of water. For example, an anionic polyelectrolyte may absorb from 100 to 1,000 times its own mass in water. In one or more embodiments, the anionic polyelectrolyte is a polyacrylate. Polyacrylates are made up of multiple acrylates, each having at least one negatively charged carboxylate group. In order to form a neutral compound, the polyacrylate may have a cationic counterion. Suitable cationic counterions include, but are not limit to, sodium (Na), potassium (K), lithium (Li), and ammonium ($NH_4$). Accordingly, the anionic polyelectrolyte of one or more embodiments may be sodium polyacrylate, potassium polyacrylate, lithium polyacrylate, ammonium polyacrylate, or combinations thereof. In particular embodiments, the anionic polyelectrolyte is sodium polyacrylate.

In one or more embodiments, $CO_2$ emulsions include a continuous phase of critical $CO_2$ or SCCO2 that suspends the previously described anionic polyelectrolyte in a discontinuous phase as discrete droplets. Such droplets may have an average diameter ranging from 10 to 200 nm.

As mentioned above, $CO_2$ emulsions include a continuous phase of carbon dioxide in a critical or supercritical state. The critical temperature for carbon dioxide is approximately 31.1° C.; the critical pressure is approximately 8.38 MPa (megapascals). In some embodiments, the carbon dioxide is in a critical state. In other embodiments, the carbon dioxide is in a supercritical state. Embodiment $CO_2$ emulsions may include SCCO2 in a temperature ranging from about 50° C. to about 100° C. and a pressure ranging from about 1500 psi (pounds per square inch) to about 5000 psi.

The carbon dioxide continuous phase may have a purity of at or greater than 90%. The purity of the carbon dioxide is determined before introduction of the anionic polyelectrolyte into the carbon dioxide, or the introduction of the carbon dioxide into a subterranean formation, as any contact may introduce external impurities into the critical or supercritical carbon dioxide. In one or more embodiments, the carbon dioxide continuous phase may have a density ranging from about 0.8 to 0.9 g/mL.

As described above, embodiment $CO_2$ emulsions may absorb an aqueous fluid downhole to provide a dense $CO_2$ emulsion. The aqueous fluid includes water. The water may comprise one or more known compositions of water, including distilled; condensed; filtered or unfiltered fresh surface or subterranean waters, such as water sourced from lakes, rivers or aquifers; mineral waters; gray water; run-off, storm or wastewater; potable or non-potable waters; brackish waters; synthetic or natural sea waters; synthetic or natural brines; formation waters; production water; reservoir water; and combinations thereof. In one or more particular embodiments, the aqueous fluid is an aqueous reservoir fluid.

Dense $CO_2$ emulsions according to the present disclosure may include a percent volume of water as compared to the total volume of water and SCCO2. In one or more embodiments, dense $CO_2$ emulsions may include from about 60 to about 70 vol. % of water. A greater water content contributes to an increased density of embodiment dispersions, as water has a greater density than SCCO2 at formation conditions.

Dense $CO_2$ emulsions of one or more embodiments may have a bulk density suitable for mitigating gravity override. Such emulsions may have a bulk density ranging from about 0.9 to about 1.1 g/mL at formation conditions.

Preparation of $CO_2$ Emulsions

Figure 2:
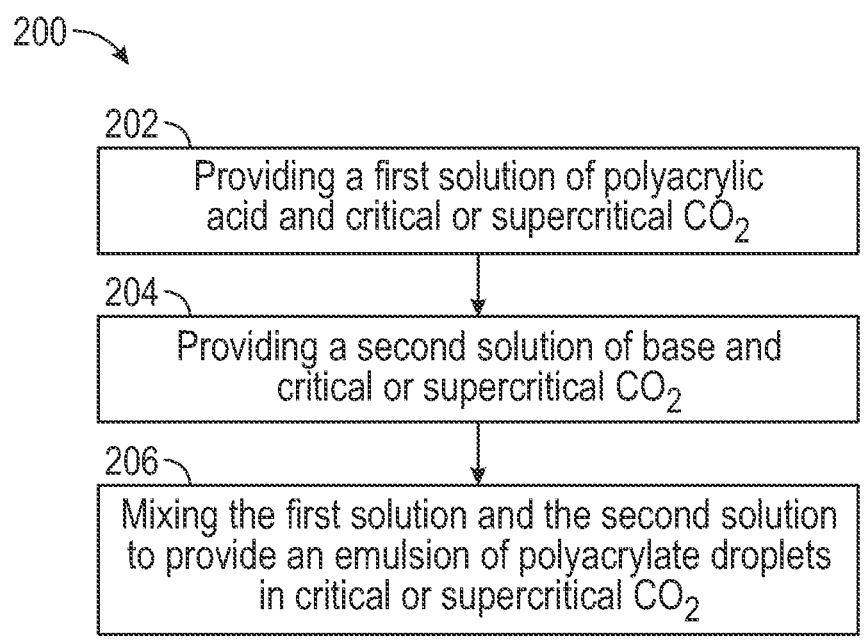
FIG. 2 is a block-flow diagram of a method of making a $CO_2$ emulsion in accordance with one or more embodiments of the present disclosure.

In another aspect, embodiments disclosed herein relate to a method of making previously described $CO_2$ emulsions. Method 200 is shown in, and discussed with reference to, FIG. 2.

In method 200, a first solution including a medium of critical or supercritical $CO_2$ and a polymeric acid is provided 202. In particular embodiments, the polymeric acid is a polyacrylic acid. Then, a second solution that includes a medium of critical or supercritical $CO_2$ and a base is provided 204. The base may include the desired cationic counterion for the anionic polyelectrolyte. For example, suitable bases include, but are not limited to, sodium hydroxide (NaOH), lithium hydroxide (LiOH), potassium hydroxide (KOH), ammonium hydroxide ($NH_4OH$), and combinations thereof. In particular embodiments, the base is NaOH.

In some embodiments, the first solution may be injected with the second solution into a subterranean formation. The first and second solutions may be injected through a wellbore via a coiled tubing. In such cases, a $CO_2$ emulsion may be produced in situ, that is, within the formation that is to be treated with the solution. As such, the treatment of the formation and the creation of the emulsion may occur virtually simultaneously. In other embodiments, the first solution may be injected with the second solution outside a subterranean formation, such as at a surface of the wellbore or in a production facility.

In method 200, mixing of the first solution and the second solution 206 causes the polymeric polymer and base to react, thus providing an initial emulsion of polyacrylate droplets in critical or supercritical $CO_2$. In one or more particular embodiments, sodium polyacrylate is formed by injecting the first solution with the second solution. In instances in which the first solution and the second solution are mixed outside a subterranean formation and an initial emulsion of polyacrylate droplets in critical or supercritical $CO_2$ is thus formed outside the subterranean formation, such emulsion may be injected into the subterranean formation after mixing. The initial emulsion may be injected into the subterranean formation through a wellbore via a coiled tubing. Once in the subterranean formation, the initial emulsion may come into contact with water. The water may be naturally occurring water downhole.

Upon contact with water, the initial emulsion may form a dense $CO_2$ emulsion as previously described. The presence of anionic polyelectrolyte may provide a $CO_2$ emulsion that is capable of absorbing a large volume of water. The water may be absorbed such that the $CO_2$ emulsion includes discrete droplets of hydrated anionic polyelectrolyte. Such droplets may have a diameter ranging from 10 to 200 nm. Due to the presence of an anionic polyelectrolyte, such emulsion may be stable for extended periods of time downhole.

Method of Use in a Hydrocarbon-Bearing Formation

In yet another aspect, embodiments disclosed here relate to a method of using previously described $CO_2$ emulsions in a hydrocarbon-bearing formation. As shown in FIG. 1, an embodiment dense $CO_2$ emulsion including an aqueous fluid and an anion polyelectrolyte is shown traversing the pore structure of a reservoir.

As discussed above, embodiment methods may include introducing an initial $CO_2$ emulsion including a continuous phase of critical $CO_2$ or SCCO2 and a discontinuous phase including an anionic polyelectrolyte into a subterranean formation, such as a hydrocarbon-bearing formation. In some embodiments, the $CO_2$ emulsion may be formed in the subterranean formation in situ. In other embodiments, the $CO_2$ emulsion may be formed outside a formation, such as at a surface of the wellbore or in a production facility.

Figure 3:
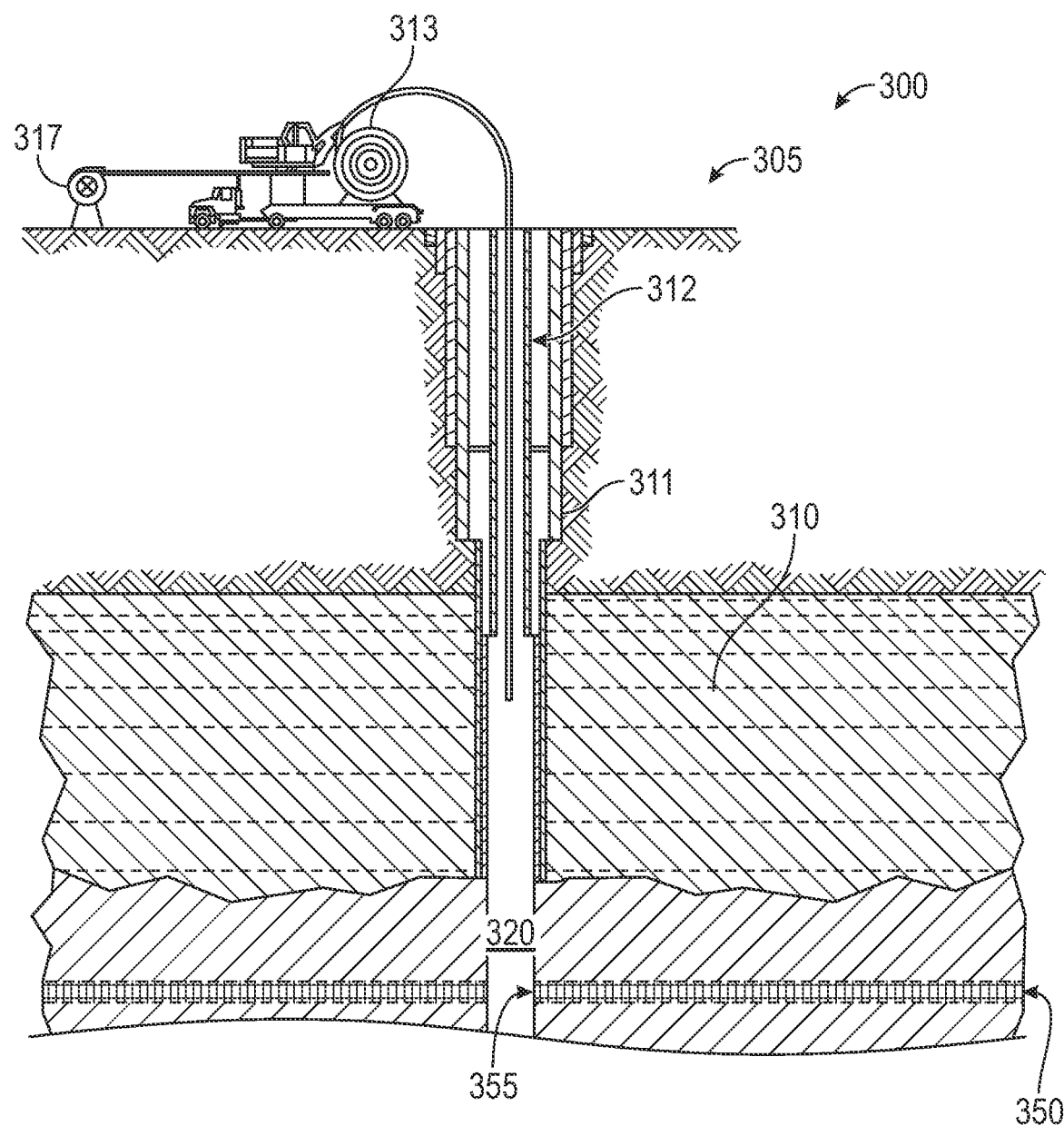
FIG. 3 is a simplified schematic of a hydrocarbon-bearing formations in accordance with one or more embodiments of the present disclosure.

FIG. 3 is a diagram that illustrates a well environment 300 in accordance with one or more embodiments. Well environment 300 includes a subsurface 310. Subsurface 310 is depicted having a wellbore wall 311 both extending downhole from a surface 305 into the subsurface 310 and defining a wellbore 320. The subsurface also includes target formation 350 to be treated. Target formation 350 has target formation face 355 that fluidly couples target formation 350 with wellbore 320 through wellbore wall 311. In this case, casing 312 and coiled tubing 313 extend downhole through the wellbore 320 into the subsurface 310 and towards target formation 350.

With the configuration in FIG. 3, the previously described initial $CO_2$ emulsion may be introduced into the subsurface 310 and towards target formation 350 via a pump 317 through the coiled tubing 313. In another embodiment, as previously described, the initial emulsion may be formed in situ, meaning two different solutions, one including a polymeric acid in a $CO_2$ medium, the other including a base in a $CO_2$ medium, may be introduced into the subsurface 310 separately via the pump 317 through the coiled tubing 313, forming the initial $CO_2$ emulsion inside the target formation 350. In such embodiments, multiple pumps may be used to separately inject components of the dispersion.

Hydrocarbon-bearing formations may include any oleaginous fluid, such as crude oil, dry gas, wet gas, gas condensates, light hydrocarbon liquids, tars, and asphalts, and other hydrocarbon materials. Hydrocarbon-bearing formations may also include aqueous fluid, such as water and brines. Hydrocarbon-bearing formations may include formations with pores sizes of from about 100 nm to 100 μm. As such, embodiment $CO_2$ emulsions may successfully traverse pores of hydrocarbon-bearing formations. Embodiment emulsions may be appropriate for use in different types of subterranean formations, such as carbonate, shale, sandstone and tar sands.

Inside the target formation 350, the initial $CO_2$ emulsion may come into contact with an aqueous reservoir fluid. In one or more embodiments, the initial $CO_2$ emulsion captures the aqueous reservoir fluid, via absorption by the anionic polyelectrolyte, such that discrete droplets of hydrated anionic polyelectrolyte are formed. Absorption of the aqueous reservoir fluid into the anionic polyelectrolyte may provide a dense $CO_2$ emulsion that has a density greater than a hydrocarbon of the target formation 350. As such, dense $CO_2$ emulsions may provide increased hydrocarbon recovery as well as reduced water cut in the recovered hydrocarbons, due to the absorption of the aqueous reservoir fluid.

Embodiments of the present disclosure may provide at least one of the following advantages. As described previously, $CO_2$ emulsions disclosed herein may have greater density than bulk supercritical $CO_2$. As such, embodiment emulsions may not have the gravity override challenges associated with SCCO2 in enhanced oil recovery applications. SCCO2 emulsions of one or more embodiments may traverse deeper into target formations to treat portions of the formation that have not been treated or that have been bypassed. Additionally, as dense $CO_2$ emulsions are prepared by absorbing downhole aqueous fluid, the water cut of produced hydrocarbons may be reduced when disclosed $CO_2$ emulsions are used for hydrocarbon recovery. The compositions and methods disclosed herein may result in higher oil recovery and increased oil production.

When the word "approximately" or "about" are used, this term may mean that there can be a variance in value of up to ±10%, of up to 5%, of up to 2%, of up to 1%, of up to of up to 0.1%, or up to 0.01%.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A composition comprising:
   a carbon dioxide ($CO_2$) emulsion comprising a continuous critical or supercritical $CO_2$ phase and a discontinuous phase comprising a polyacrylate,
   wherein the polyacrylate has a cationic counterion selected from the group consisting of sodium, lithium, potassium, ammonium, or combinations thereof, and
   wherein the discontinuous phase is dispersed in the continuous critical or supercritical $CO_2$ phase as droplets having an average diameter ranging from 10 to 200 nm.

2. The composition of claim 1, wherein the discontinuous phase further comprises an aqueous reservoir fluid.

3. The composition of claim 2, wherein the emulsion comprises the aqueous reservoir fluid in an amount of 60 to 70 vol. %, based on the total volume of the $CO_2$ emulsion.

4. The composition of claim 1, wherein the polyacrylate is sodium polyacrylate.

5. The composition of claim 1, wherein the emulsion has a bulk density of 0.9 to 1.1 g/mL at formation conditions.

6. A method of making a carbon dioxide ($CO_2$) emulsion comprising:
   providing a first solution of a polyacrylic acid and critical or supercritical $CO_2$;
   providing a second solution of a base and critical or supercritical $CO_2$; and
   mixing the first solution and the second solution such that the polyacrylic acid and the base react to form an emulsion of polyacrylate droplets in critical or supercritical $CO_2$,
   wherein the polyacrylate droplets have a cationic counterion selected from the group consisting of sodium, lithium, potassium, ammonium, or combinations thereof, and
   wherein the polyacrylate droplets are dispersed in the critical or supercritical $CO_2$ as droplets having an average diameter ranging from 10 to 200 nm.

7. The method of claim 6, further comprising introducing an aqueous fluid into the emulsion of polyacrylate droplets in supercritical $CO_2$.

8. The method of claim 7, wherein the polyacrylate droplets absorb the aqueous fluid in an amount from 100 to 1,000 times a mass of the polyacrylate droplets.

9. The method of claim 7, wherein the aqueous fluid is an aqueous reservoir fluid.

10. The method of claim 6, wherein the mixing the first solution and the second solution is performed at a surface of a wellbore.

11. The method of claim 6, wherein the mixing the first solution and the second solution is performed in a hydrocarbon-bearing formation.

12. The method of claim 6, wherein the base is sodium hydroxide (NaOH).

13. The method of claim 6, wherein the polyacrylate droplets are sodium polyacrylate droplets.

14. A method for treating a hydrocarbon-bearing formation comprising:
   introducing an emulsion into the hydrocarbon-bearing formation, the emulsion comprising a continuous critical or supercritical carbon dioxide ($CO_2$) phase and a discontinuous phase comprising a polyacrylate, wherein the polyacrylate has a cationic counterion selected from the group consisting of sodium, lithium, potassium, ammonium, or combinations thereof; and
   wherein the discontinuous phase is dispersed in the continuous critical or supercritical $CO_2$ phase as droplets having an average diameter ranging from 10 to 200 nm;
   contacting the emulsion with an aqueous reservoir fluid in the hydrocarbon-bearing formation; and
   absorbing an amount of the aqueous reservoir fluid into the polyacrylate of the emulsion to provide a dense $CO_2$ emulsion.

15. The method of claim 14, wherein the polyacrylate absorbs the aqueous reservoir fluid in an amount from 100 to 1,000 times a mass of the polyacrylate.

16. The method of claim 14, wherein the dense $CO_2$ emulsion has a bulk density greater than a density of a hydrocarbon in the hydrocarbon-bearing formation.

* * * * *